US012078538B2

(12) United States Patent
Borremans et al.

(10) Patent No.: US 12,078,538 B2
(45) Date of Patent: Sep. 3, 2024

(54) DETECTION OF LIGHT SOURCE DISTORTION IN AN IMAGING SYSTEM

(71) Applicant: Spectricity, Mechelen (BE)

(72) Inventors: Jonathan Borremans, Lier (BE); Maarten De Bock, Ghent (BE); Ward van der Tempel, Keerbergen (BE); Jeroen Hermans, Leuven (BE)

(73) Assignee: Spectricity, Mechelen (BE)

( * ) Notice: Subject to any disclaimer, the term of this patent is extended or adjusted under 35 U.S.C. 154(b) by 274 days.

(21) Appl. No.: 17/649,364

(22) Filed: Jan. 30, 2022

(65) Prior Publication Data

US 2022/0244103 A1 Aug. 4, 2022

Related U.S. Application Data

(60) Provisional application No. 63/144,147, filed on Feb. 1, 2021.

(51) Int. Cl.
*G01J 3/28* (2006.01)
*G01J 3/02* (2006.01)

(52) U.S. Cl.
CPC ........... *G01J 3/2823* (2013.01); *G01J 3/0275* (2013.01)

(58) Field of Classification Search
CPC ...... G01J 3/2823; G01J 3/0275; H04N 23/70; H04N 23/745
See application file for complete search history.

(56) References Cited

U.S. PATENT DOCUMENTS

| | | | |
|---|---|---|---|
| 10,432,875 B2 * | 10/2019 | Nakamura | H04N 25/76 |
| 2007/0109425 A1 | 5/2007 | Poplin et al. | |
| 2014/0354847 A1 | 12/2014 | Kasai | |
| 2015/0146998 A1 | 5/2015 | Fuchigami | |
| 2015/0163392 A1 | 6/2015 | Malone et al. | |
| 2015/0358570 A1 | 12/2015 | Taniguchi | |
| 2018/0041681 A1 * | 2/2018 | Pope | H04N 23/72 |
| 2019/0273869 A1 * | 9/2019 | Ramalingam | H04N 23/683 |

OTHER PUBLICATIONS

International Searching Authority; International Search Report and Written Opinion; International Application No. PCT/US2022/014575; May 4, 2022; 10 pgs.

* cited by examiner

*Primary Examiner* — Maurice C Smith
(74) *Attorney, Agent, or Firm* — Garlick & Markison; Kelly H. Hale

(57) ABSTRACT

An imaging system includes a plurality of optical sensors arranged on an integrated circuit in an array with a plurality of rows and a plurality of columns. The system includes an interface communicating with the plurality of optical sensors, memory storing operational instructions and processing circuitry configured to sample an image using the plurality of optical sensors in a first mode and sample at least a portion of the image sequentially on a row-by-row basis at a predetermined sampling rate in a second mode to produce row by row sample outputs. The processing circuitry is further configured to initiate sampling at least some rows of the plurality of rows of optical sensors using different time stamps.

26 Claims, 10 Drawing Sheets
(2 of 10 Drawing Sheet(s) Filed in Color)

DETECTION OF LIGHT SOURCE DISTORTION IN AN IMAGING SYSTEM

CROSS-REFERENCE TO RELATED APPLICATIONS

The present U.S. Utility Patent application claims priority pursuant to 35 U.S.C. § 119(e) to U.S. Provisional Application No. 63/144,147, entitled "DETECTION OF LIGHT SOURCE DISTORTION IN A DIGITAL IMAGING SYSTEM", filed Feb. 1, 2021, which is hereby incorporated herein by reference in its entirety and made part of the present U.S. Utility Patent Application for all purposes.

BACKGROUND OF THE INVENTION

Technical Field of the Invention

This invention relates generally to digital imaging and more particularly to compensating for light source distortion using spectral sensors with interference-based filters.

Digital imaging has had a profound effect on the quality and availability of camera technology. At the same time, the expectations of camera consumers have become ever more demanding, especially for cameras embedded in modern smart phones. Automated white balancing, for example, has improved the quality of camera imaging by compensating for the distorting effects of various light sources on a cameras output.

In some digital imaging applications light source distortion originates from artificial illumination sources with substantially definable temporal light modulations or periodic intensity variations such as flickering. Detection and classification of light distortion can be used to increase the performance of digital imaging systems.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee."

Figures 5A, 5B:
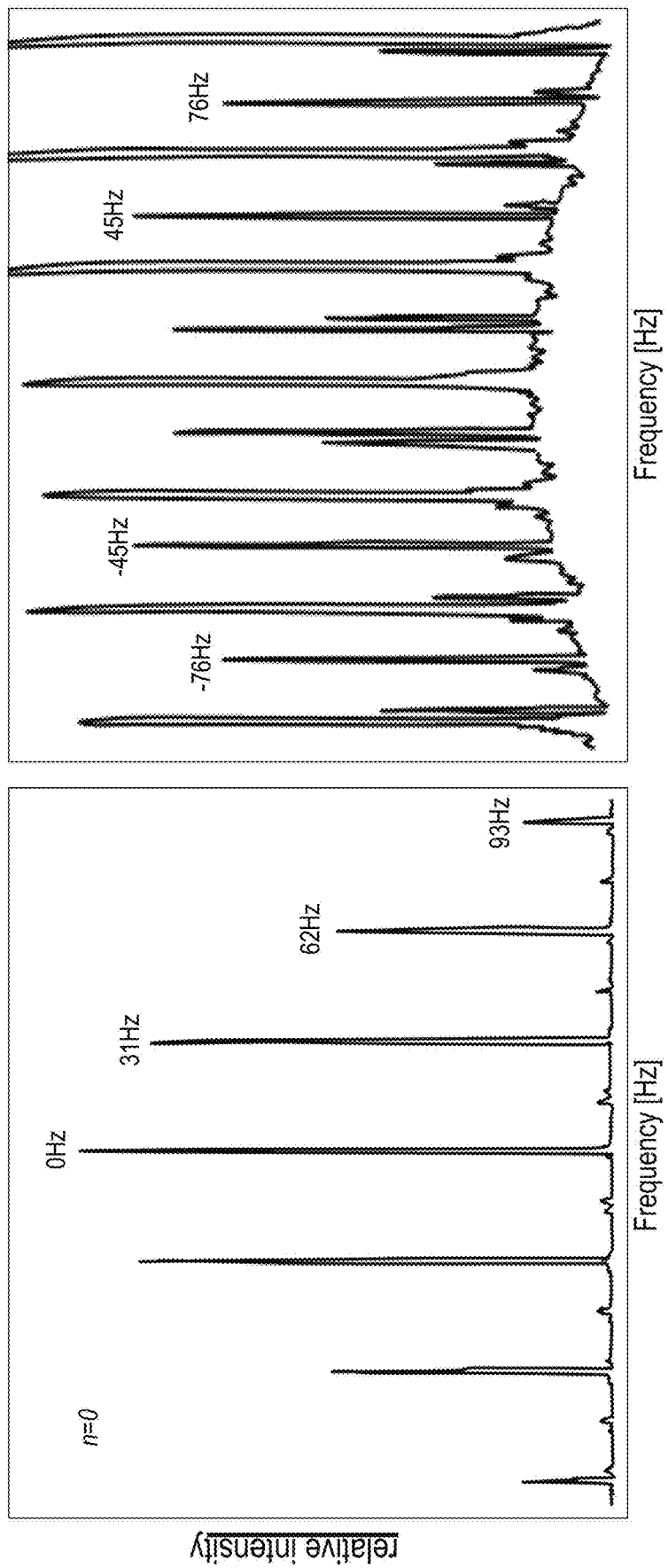
Figure 6:
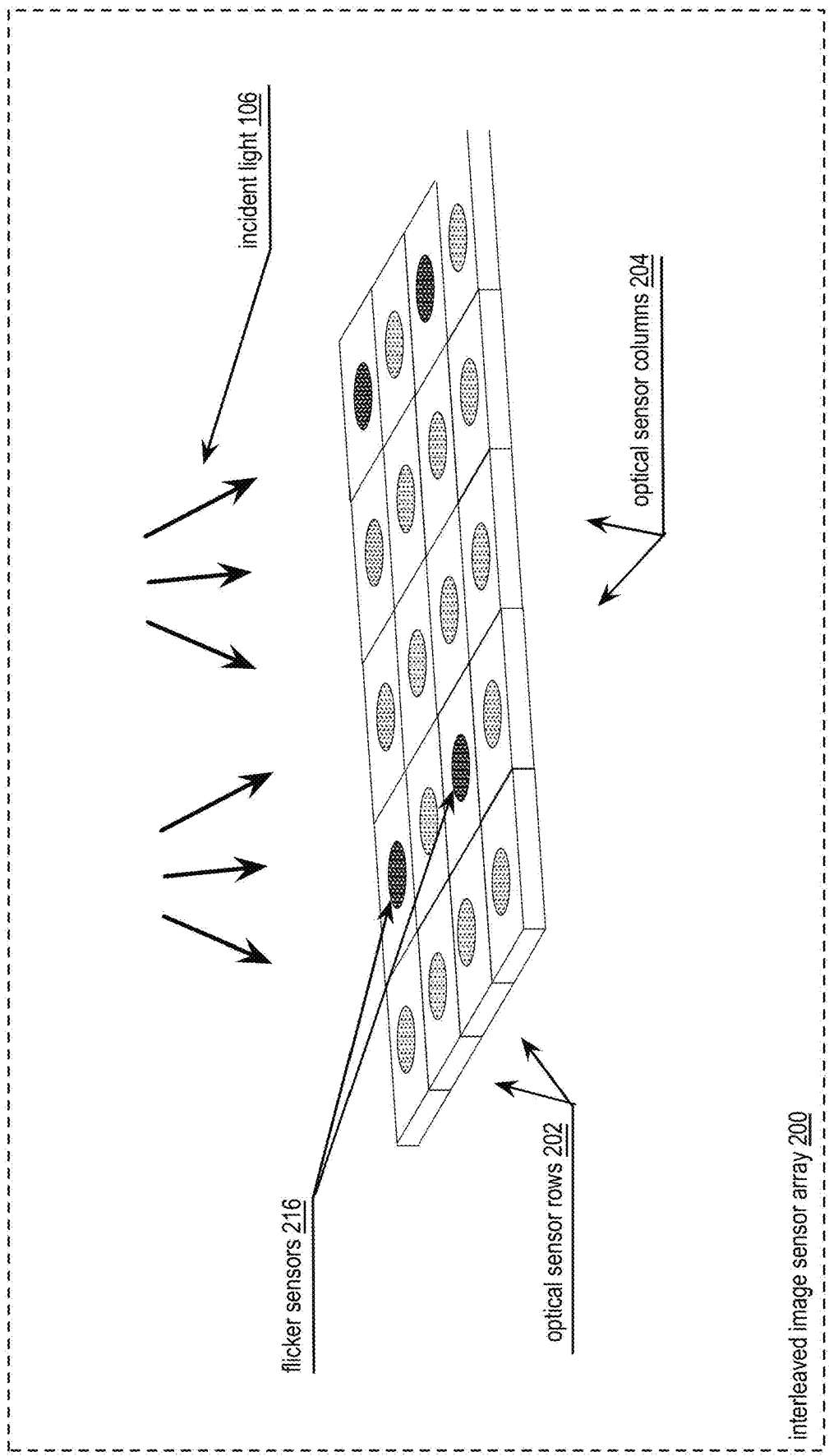

FIG. 5A provides an example spectrum for a flicker source in accordance with the present invention;

FIG. 5B provides an example extracted spectrum from an image for a flicker source in accordance with the present invention; and FIG. 6 illustrates an example image sensor array with pixels (light sensitive elements) of two types configured in rows and columns in accordance with the present invention.

DETAILED DESCRIPTION OF THE INVENTION

In various embodiments, small-scale digital imaging systems can be adapted for use in applications that can benefit from correction for lighting anomalies. Examples of such applications include, but are not limited to, smart mobile phones, high resolution cameras, video cameras, security cameras, calibration systems, inspection systems and certain industrial applications.

Incandescent lights, fluorescent lights and light emitting diodes (LEDs) each distort the light that a digital imaging system captures. Other light sources, such as sodium streetlights, distort an image sensor's output sufficiently that most colors are difficult to distinguish. Additionally, artificial illumination sources such as incandescent lamps, fluorescent lamps, LEDs, pulsed VCSELS & lasers used for LIDAR detection and digital displays can have definable temporal light modulations or periodic intensity variations, such as flickering. In an example, flickering can originate from, for example, the AC component of an electricity supply or from the intrinsic refresh rate of a digital imager or display. In various embodiments, flickering is used as a fingerprint to identify and/or classify illumination sources in digital imaging applications. In some embodiments, information relative to flickering can be used to provide corrections of camera images, such as color and/or white balancing corrections.

Figure 1:
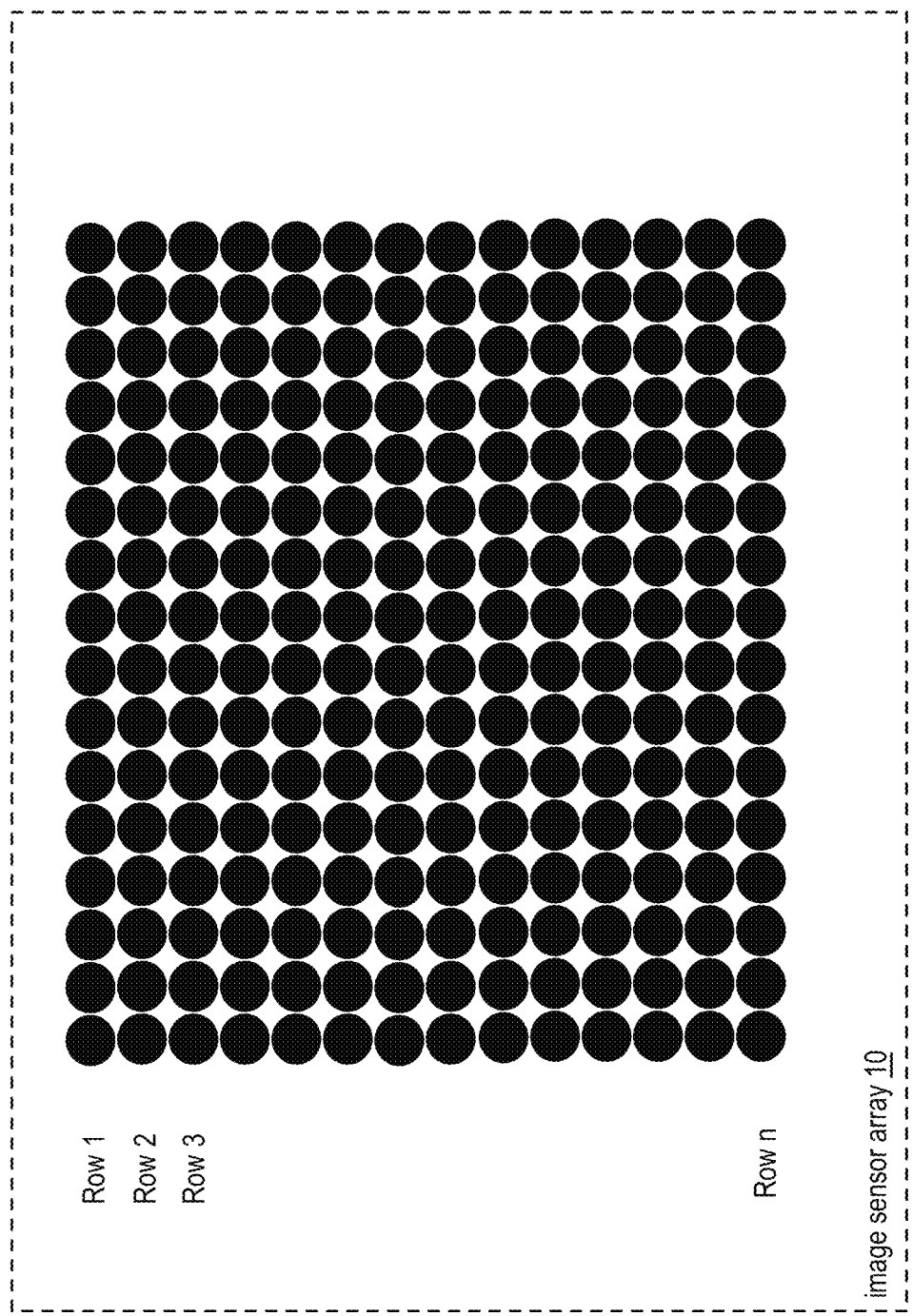
FIG. 1 illustrates an example image sensor array with pixels configured in rows and columns in accordance with the present invention.

FIG. 1 illustrates an example image sensor array 10 with pixels (light sensitive elements) configured in rows and columns. In the example, image sensor array 10 includes row 1 row N and columns 1-column M of pixels to provide a total of N×M pixels. In an example, imaging sensor array 10 samples signals from the N×M light sensitive elements to capture light from spatial areas of a scene. Example frame rates of imaging sensors are in the range of 30-100 Hz, which can be insufficient to detect flickering from an artificial illumination source. In an example, light source distortion can comprise artifacts such as banding, image quality and distortion issues.

Referring again to FIG. 1, the light sensitive elements of an imaging sensor form rows (as part of a pixel array of rows and columns). In an example, an imaging sensor can be configured to operate in a flickering detection mode. In a specific example, flickering detection mode can be the primary operation of the image sensor. In a specific example of implementation and operation, each row of optical sensors can be configured to sample a scene sequentially to achieve a row sampling rate in a range sufficient to detect flickering, for example in range of kilohertz (kHz) and mega-hertz (MHz). In an example, row-by-row sampling can be referred to as using a "rolling shutter". In a specific example, an imaging system can be configured to capture an image using a rolling shutter while concurrently detecting flicker sources associated with the image. In a related example, an imaging system operating with a rolling shutter can be configured to detect flicker sources for a predetermined time period before and/or after an image is captured.

In an example, the sampling of different rows, such as different rows R1-RN of image sensor array 10, can be configured to overlap, but at least some rows have start and/or stop times at different time stamps. In an example, a readout of image sensor samples in a flickering detection mode can be executed as a sequence of row images, with a full or partial image frame constructed from the sequential row images.

In an example, an image sensor can be implemented with a focusing lens. In a specific example, the lens is first in a defocused position, so that spatial resolution of the scene is blurred, to assist the flicker detection. In the example, the lens is then implemented in a focused position to sample an image. In another example, when flicker frequency is a multiple of the frame rate, flicker detection can be negatively impacted. In a specific example of implementation and operation, an image sensor system can be adapted so that the frame rate can be varied in a series of images, allowing flicker detection to be decoupled from a given frame rate.

In an example, flicker can be detected by evaluating the output from rows of an image sensor as a function of time. Accordingly, when an element, such as a light source or a reflection of a light source in a scene, contributes a flicker, different rows of the image sensor can be subject to different intensities from the flickering source. In an example, this can be due to each row sampling at an incrementally different point in time. In an example, each rows can be used to "sample" the flickering source during a time interval. In a specific example of implementation, flickering from one or more illumination (light) sources can be detected, with the frequency of the light source being calculated by analyzing row outputs across time using a signal processing methodology such as Fast-Fourier transform (FFT), Discrete-Fourier transform (DFT) or another frequency-temporal algorithm. In an example, by organizing the data from the row-by-row sampling in two dimensions and applying a two-dimensional Fast-Fourier transform (2D-FFT), a given analysis can be simplified.

Figure 2:
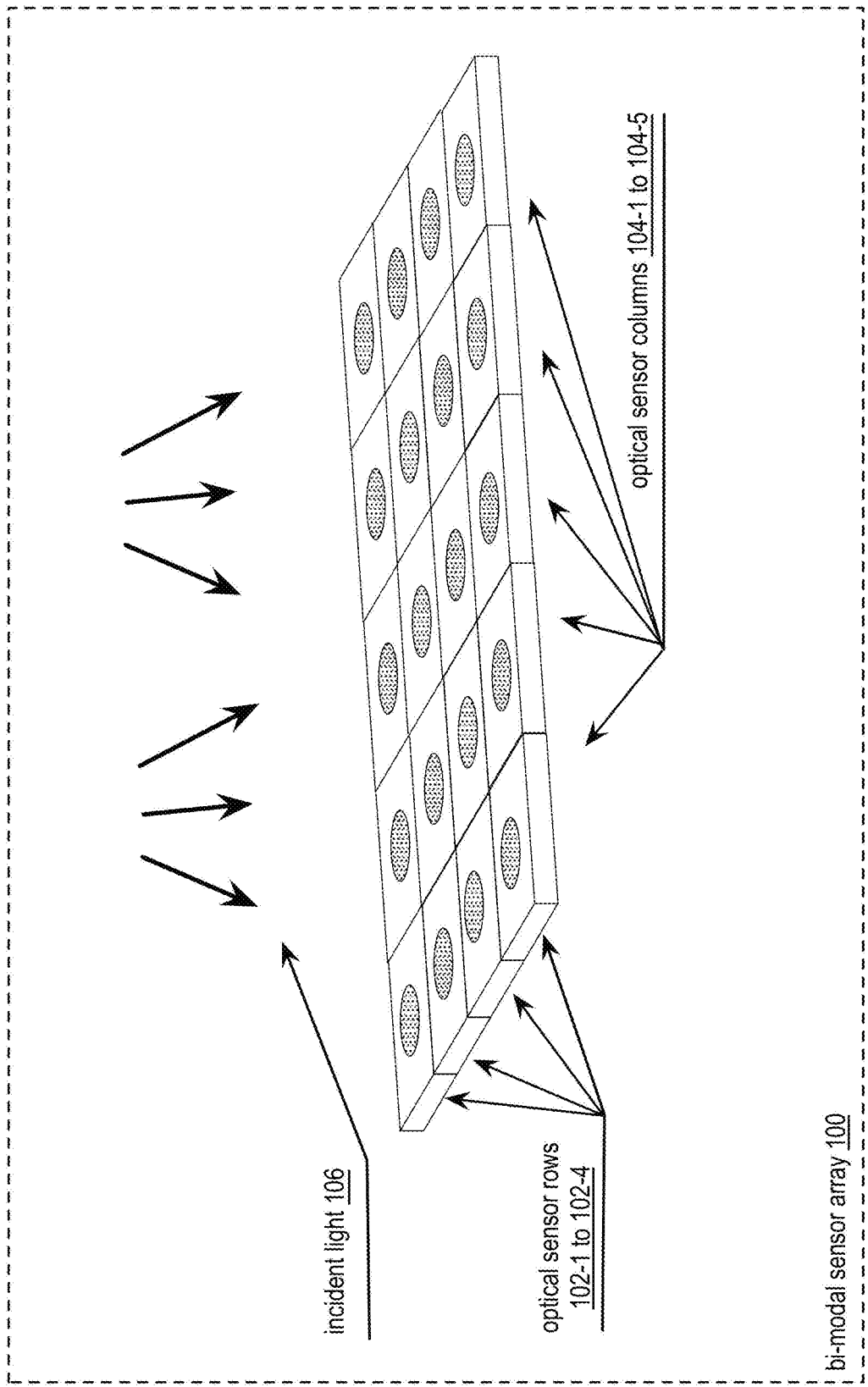
FIG. 2 illustrates an example bi-modal image sensor array with pixels configured in rows and columns in accordance with the present invention.

FIG. 2 illustrates an example bi-modal image sensor array with pixels (light sensitive elements) configured in rows and columns. In the example, bi-modal image sensor array 100 is configured in optical sensor rows 102 and optical sensor columns 104, such that incident light 106 from a scene sampled can be sampled by the bi-modal image sensor array 100. In an example configuration, optical sensor rows 102 1-4 can be sampled in a sequential manner when the bi-modal image sensor array 100 is operating in a flicker detection mode. In an example, when the bi-modal image sensor array 100 is operating in a normal or image capture mode the bi-modal image sensor array 100 can be configured to sample incident light 106 from a scene in a "global shutter" mode, where the entire frame is captured at substantially the same instant. In a specific example, the bi-modal image sensor array 100 is coupled to a control mechanism, such as a processor, a state machine or another mechanism that can alternate between operational modes of bi-modal image sensor array 100. In a specific related example, the bi-modal image sensor array 100 can be configured to operate in flicker detection mode in a substantially continuous manner until an image is ready to be captured, at which time the bi-modal image sensor array 100 can be switched to a global shutter mode during image capture.

Figures 3A, 3B:
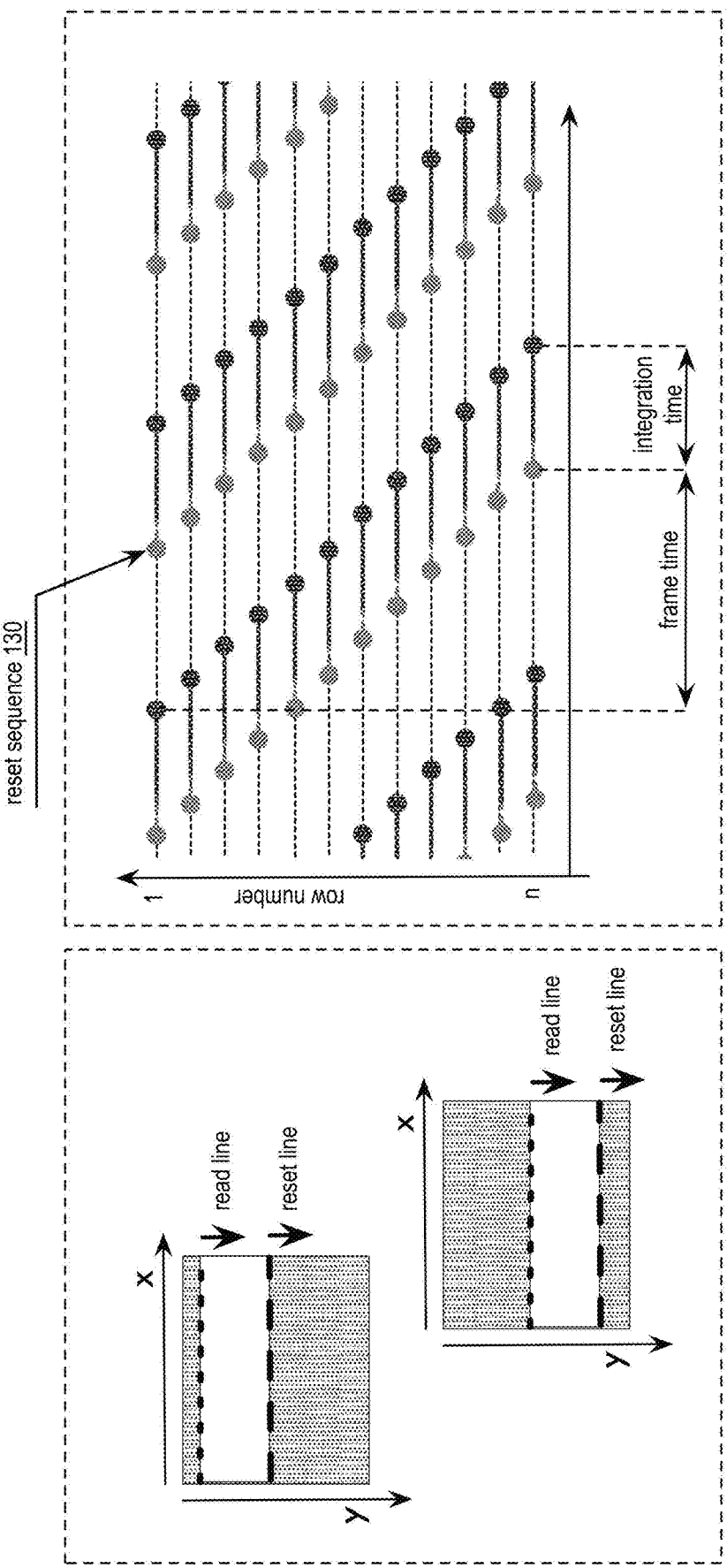
FIGS. 3A and 3B illustrate the sequence and timing of an example flicker detection operation in an image sensor in accordance with the present invention.

FIGS. 3A and 3B illustrate the sequence and timing of an example flicker detection operation for image sensing. In an example, a Read/Reset window includes spectral sensors in a row of spectral sensors ("x" direction), with the Read/Reset window transitioning over a period of time from row-to-row ("y" direction). In the example a Read/Reset window begins with a read line (dotted line running in the x direction) and resets with a reset line (dashed line running in the x direction). FIG. 3B illustrates multiple rows of sensors sampling over time line-by-line using reset sequences (identified as reset sequence 130, where the reset sequence includes all of the sensors between the gray sensor and the dark sensor) such as the Read/Reset window of FIG. 3A. In a specific example, a frame time begins with the end of reset sequence in $1^{st}$ row and ends at the beginning of a reset sequence in row n. In another example, a Read/Reset window includes spectral sensors in a row ("x" direction) of spectral sensors.

In a specific example of implementation, a Discrete-Fourier transform (DFT) can be performed on the temporal row values of the sensor, while frequencies from the DFT can be used to represent the flickering source ($F_{flicker}$). In an example, the frequencies collected may be the frame rate ($F_{frame}$), the flicker rate ($F_{flicker}$) or multiples and folds of ($m*F_{frame}+n*F_{flicker}$). In another example, when the frame rate is known, a flicker frequency can be determined. In specific examples, a resultant signal can be configured to consider a single frame, or a sequence of multiple frames.

Figure 4A:
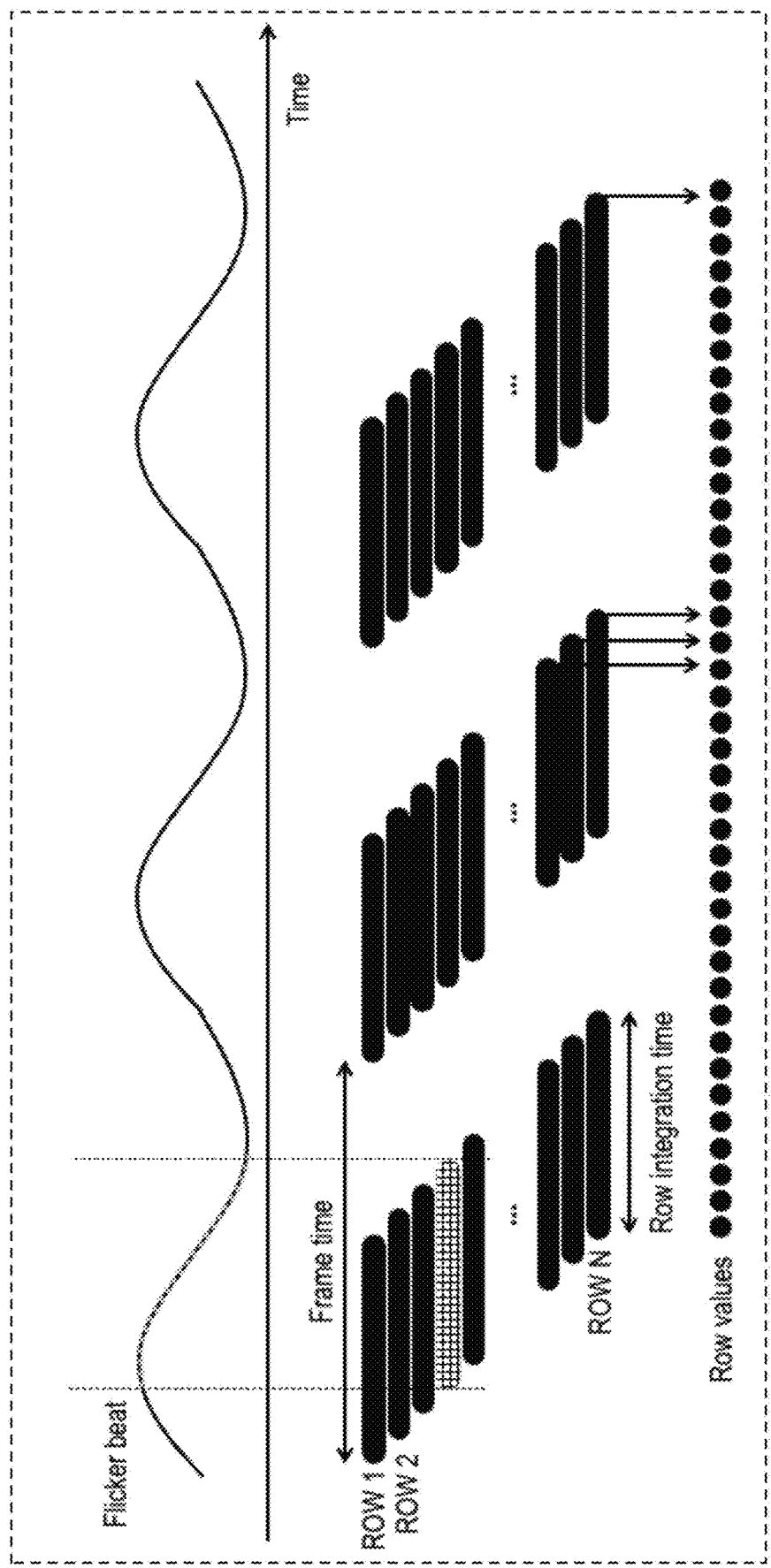
FIG. 4A illustrates an overview of an example flicker detection method in an image sensor in accordance with the present invention.

FIG. 4A illustrates an overview of an example flicker detection method in an image sensor. In the example, the amplitude of a flicker source is shown at the top as a function of time, while an example image sensor row-by-row integration for several frames of sampling is shown below. In an example, a Discrete-Fourier transform (DFT) can be configured to provide resultant frequency-based peaks for a given flicker source.

Figure 4B:
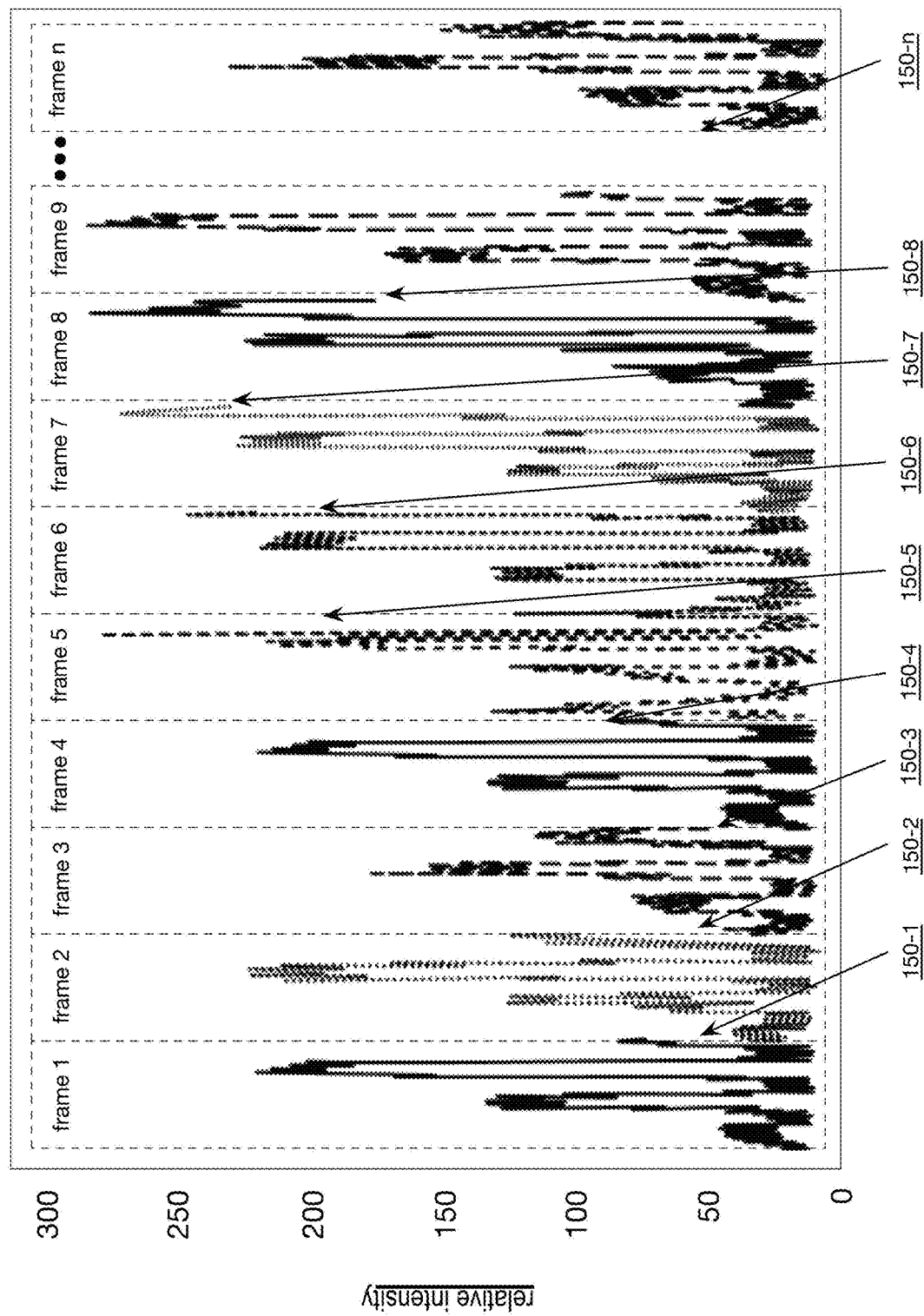
FIG. 4B illustrates phase discontinuities from flicker detection in an image sensor in accordance with the present invention.

FIG. 4B illustrates an overview of an example flicker detection method adapted to compensate for time-based discontinuities. In an example, row values from different frames of sampled sensors are organized time-wise for flicker determination signal, discontinuities in the signal can appear as artifacts when using the signal to determine flicker frequencies using frequency-temporal algorithms. In the example of FIG. 4B, when frames 1-n are assembled, sample intensities are not continuous at frame boundaries 150-1 through 150-n.

In a specific example of implementation and operation, discontinuity artifacts can be removed or attenuated by separating row values of different frames by stacking them in a two dimensional (2D) matrix and then performing a 2D Fast Fourier Transform (FFT) or Discrete Fourier Transform (DFT) function on the separated row values. In an example, the effect of the flickering can be separated from the artifacts introduced by a frame change discontinuity.

Figure 4D:
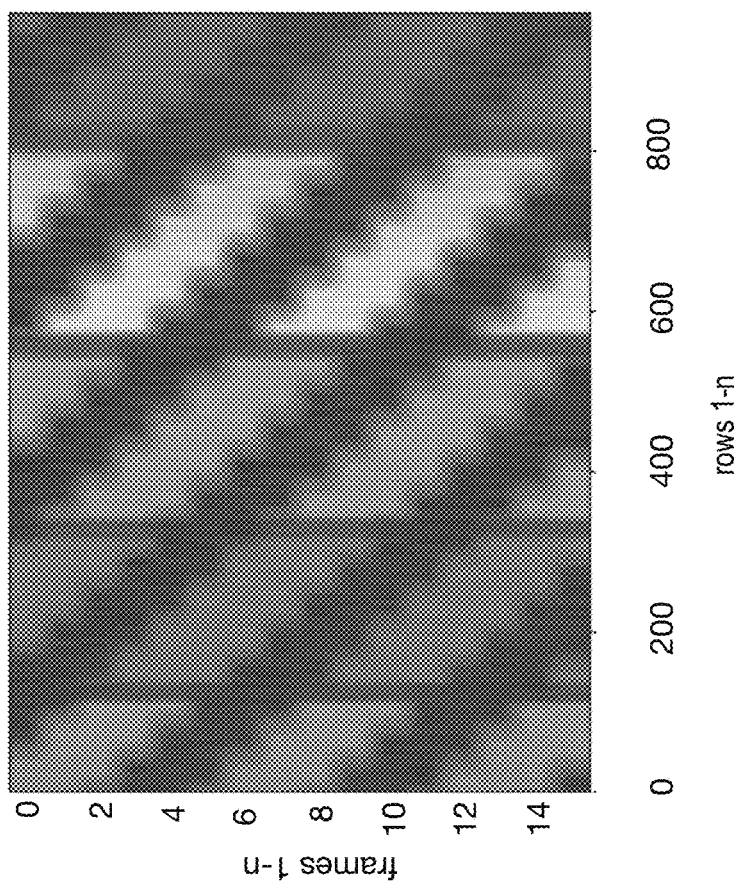
FIG. 4D illustrates flicker detection output from in an image sensor in accordance with the present invention.
Figure 4C:
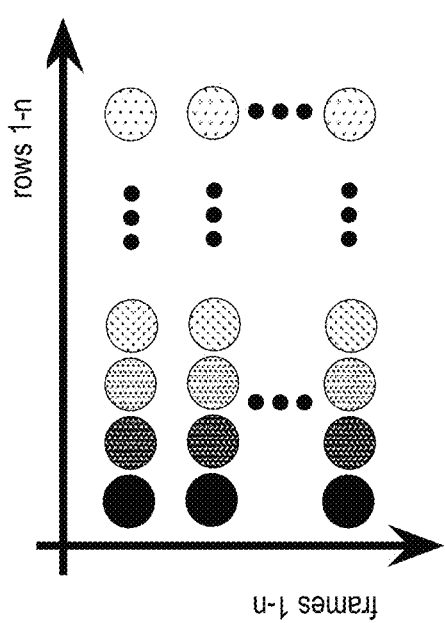
FIG. 4C illustrates an overview of an example flicker detection method in an image sensor in accordance with the present invention.

FIGS. 4C and 4D illustrate a correlation between row-by-row flicker detection across multiple frames (FIG. 4C) with the resultant image of FIG. 4D. In the example, image flicker appears as periodic function in each frame. In an example, the flicker is not in sync with the frame rate, so the flicker shifts phase from frame-to-frame. In an example, the flicker shift is reflected as a periodic function under a tilt angle.

Figure 4E:
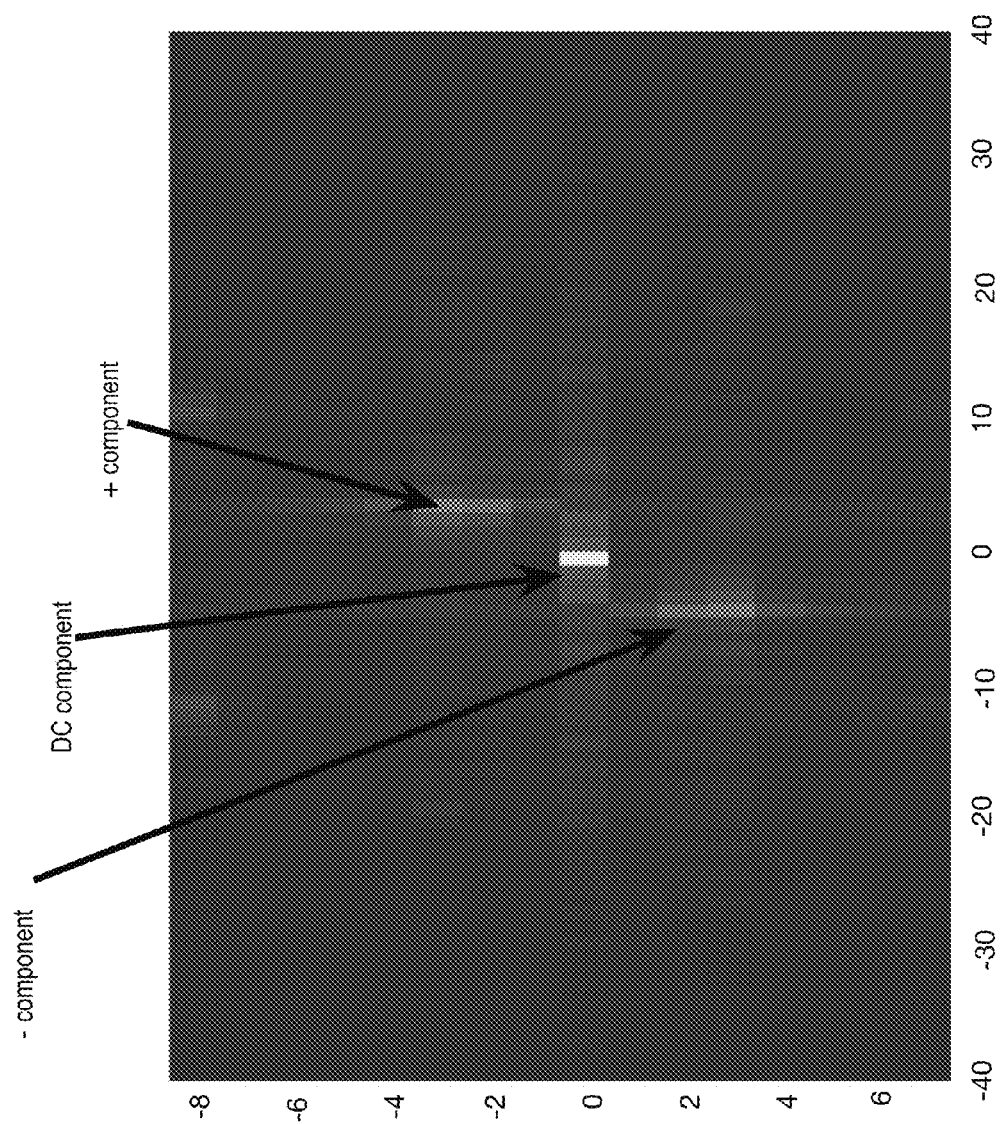
FIG. 4E illustrates flicker detection output using a 2D Fast Fourier Transform method for an image sensor in accordance with the present invention.

FIG. 4E illustrates flicker in a two-dimensional (2D) Fast Fourier Transform (FFT). In an example, the effect of flicker appears as a peak in the 2D FFT with non-zero frequency. In the example, once the DC component is removed the flicker frequency can be determined. In an example, the 2D Fourier Transforms includes a number of one-dimensional Fourier transforms achieved by first transforming each row, i.e. replacing each row with its 1D Fourier transform. In an example, a first step yields an intermediary 'picture' in which the horizontal axis is frequency f and the vertical axis is frames, such as the frames illustrated in FIG. 3B. A second step is to apply a 1D Fourier transform individually to the vertical line(s) of the intermediate image(s). This new image will be the 2D Fourier transformation of the initial image.

Figure 4F:
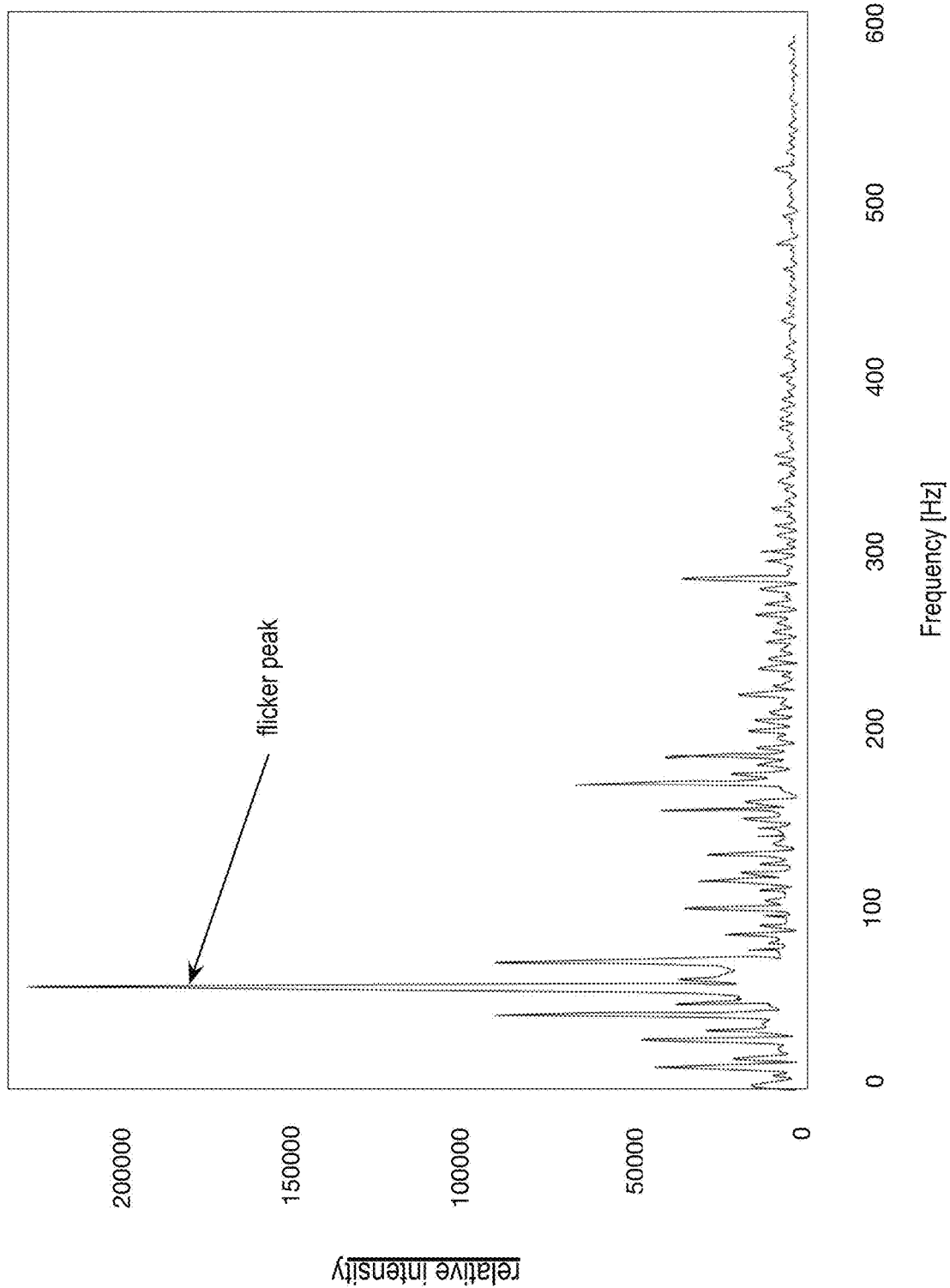
FIG. 4F illustrates another flicker detection output using a 2D Fast Fourier Transform method for an image sensor in accordance with the present invention.

FIG. 4F illustrates flicker frequency determined using a 2D FFT. In the example, a peak frequency resulting from the 2D FFT can then be used to attenuate or remove the flicker from an image captured by an image sensor. In another example, the peak frequency resulting from the 2D FFT can be used to remove or attenuate a flicker at the image sensor itself.

FIG. 5A provides an example sampled spectrum for a flicker source. In the example, the sampled spectrum has peaks of measured amplitude at various frequencies, resulting from harmonics. In the example, $F_{frame}$=Frame rate=31 Hz and $F_{flicker}$=Flicker rate=45 Hz, with peaks expected on $m*F_{frame}+n*F_{flicker}$. In an example, the signal at 31 Hz is larger than the other signals because $F_{frame}$ is dominant.

FIG. 5B provides an example extracted spectrum for a flicker source, such as the flicker source provided in FIG. 5A. In the example, the extracted spectrum from an image presents frequency peaks at $m*F_{frame}+n*F_{flicker}$, with m and n being integer values. In an example, peaks at +/−76 Hz, +/−

In a specific example of implementation and operation, red, green and blue (RGB) pixels of an RGB sensor can be separated for flicker detection. In the example, samples from each of the red, green and blue pixels can be analyzed separately to provide additional information for detection and classification of a given light source. Referring to FIG. 2, in an example, an image sensor, such as bi-modal image sensor array 100, can be configured as a spectral sensor to provide additional spectral information about a light source, allowing still more information for detection and classification. In a specific example, bi-modal image sensor array 100 can be a hyperspectral image sensor.

Referring again to FIGS. 1 and 2, in a specific example of implementation, all of the pixels in a given row can be summed to provide the information for flicker analysis of a substantially complete image. In an alternative example, the pixels in a region-of-interest in an image can be used to provide the information for flicker analysis and/or for determining the spatial location of one or more flicker sources in an image.

In a specific example of implementation and operation, unprocessed or "raw" data from light sensing elements can be used for flicker analysis. In an alternative example, the raw data can be pre-processed to allow temporal variations (such as movement during image capture) and/or spatial anomalies based on frequency (such as banding and line patterns) can be removed before an image, or region-of-interest in an image, is processed. In a related example, two instances of a row can be treated in a subtraction process to remove undesired spatial information. In another related example, two consecutive temporal images can be subject to a subtraction process to remove spatial anomalies.

In another example, an image sensor can be configured to include a readout mode operable to remove non-relevant and/or undesirable frequencies in a scrambling process. In a related example, an image sensor is configured to first be read row-by-row from the top of the sensor and then row-by-row from the bottom of the sensor, to chop out non-relevant and/or undesirable frequencies. In a related example, a filtering operation can be used to extract the relevant/desired frequencies from a readout.

In a specific example of operation, an image sensor is configured to operate at 100 frames-per-second (fps), with a 10 kHz line rate to detect a flicker occurring at 49 Hz. In a related example, a detected flicker frequency (for example 49 Hz) can be used for correction of an image output from an image sensor. In another example, a detected flicker frequency can be used to adjust an image sensor adapted to provide a variable frame rate, allowing the image sensor to attenuate or eliminate the effect of the flicker source. In another example, a detected flicker can be used to adjust amplitude of an image or affected portions of an image. In yet another example, a detected flicker can be used to adjust a color balancing algorithm in an image processor. In still another example, an image can be adjusted for spatial effects based on a determined spatial location of a flicker source. In another example, an adjustment can be made based on the wavelength range of the flicker source so that the adjustment is limited to just the relevant colors affected by the flicker source. In an example of implementation, a processor is included in an imaging system to calculate flicker effects and then correct an image and/or pixel outputs.

In another specific example of implementation and operation, an imaging system can be configured with two imaging sensors that are operable to provide concurrent imaging and flicker correction. In an example, the first imaging sensor of the two imaging sensors is configured to operate in a flickering detection mode, with the second imaging sensor configured to operate in an imaging mode. In the example, flicker information generated by the first imaging sensor can be used to correct the image acquisition of the second imaging sensor. In a related example, flicker information generated by the first imaging sensor can be used to adjust the settings of the second imaging sensor to attenuate or eliminate the undesirable effects of the flicker in a resultant captured image. In yet another example, a plurality of imaging sensors are used in flickering or imaging modes to further improve flicker correction. In a specific example a first imaging sensor of a plurality can be configured to have higher spatial resolution than one or more other imaging sensors in an imaging system comprising a plurality of imaging sensors.

In an example, an image sensing system includes a focusing lens. In the example, the focusing lens is used in a defocused mode, so that the spatial resolution of a scene is blurred to assist in the detection of flicker. In a related example the focusing lens is used in a focused mode to capture an image.

In specific example of implementation, an imaging system is configured to use a portion of the rows in an imaging sensor to execute flickering detection. In an alternative example, an imaging system is configured to use all of the rows in an imaging sensor to execute flickering detection. In an example, an imaging sensor is configured to implement a flicker detection mode, that first uses all rows and then second uses a subset of the rows read sequentially, thereby allowing sampling rate in the kHz-MHz range while at the same time retaining some spatial information. In the example, the flickering mode allows determination of both the frequency and the location of light sources exhibiting flickering. In a related example, different flickering sources can be found by employing digital signal processing techniques. In another example of implementation, an imaging system is configured to use a plurality of row rates to optimize the measurement time required for providing a desired flicker frequency detection resolution.

When a flicker frequency is a multiple of a selected frame rate, flicker detection can be adversely affected. In an example of implementation, an imaging system is configured to include variable frame rates for a series of captured images. In a related example, when a given flicker frequency is a multiple of the frame rate, which may be detrimental to the flicker detection. In another related example, multiple frame rates can be used to prevent a situation where a spatial frequency associated with a scene or image is falsely detected as a flicker frequency from a light source.

In a specific example of implementation, an imaging system includes a plurality of optical sensors on an integrated circuit, where the plurality of optical sensors are arranged in an array and the array comprises a plurality of rows and a plurality of columns. In the example, a processing module is operably coupled to each optical sensor of the plurality of optical sensors, and the processing module, when operable within the imaging system, is configured to sample an image in a first mode and sample at least a portion of the image sequentially on a row-by-row basis at a predetermined sampling rate in a second mode to produce row by row sample outputs, where the processing module is further configured to initiate sampling at least some rows of the plurality of rows using different time stamps.

In an example, the imaging system includes an interface, memory that stores operational instructions and a second processing module operably coupled to the interface and to the memory, where the second processing module, when operable within the imaging system based on the operational instructions, is configured to determine a periodic intensity variation from a light source associated with the image, where the periodic intensity variation is determined by analyzing a plurality of row-by-row sample outputs based on the different time stamps and where the analyzing is executed using a frequency-temporal algorithm. In an example, the frequency-temporal algorithm is based on at least one of a Fast Fourier Transform (FFT) and a Discrete Fourier Transform (DFT). In a specific example of operation, the outcome of a frequency-temporal algorithm can be compared to known flicker sources for classification purposes and/or attenuation of the flicker source.

When illuminated by a light source, light sensitive elements (such as photo-diodes) can generate photo-electrons (photon-electrons) and photo-holes (photon-holes) necessarily in the depletion region of the light sensitive elements. Example image sensors are routinely configured to measure light by collecting photon-electrons generated in a light sensitive element. While photon-holes generated in a light sensitive element can be evacuated to the ground of the circuit, the associated hole current is also representative of collected photon-electrons. In an example, an image sensor is configured so that substantially all of the hole currents for the light sensitive elements in an image sensor or a portion of an image sensor are collected together and continuously measured over time. In the example, a resultant temporal measurement can include a full image illumination, as well as a flicker component. In an example, an imaging system can be configured to perform frequency analysis of the collective hole current to provide a flicker frequency. In a related example, performance of an image sensor's normal function is left un-impacted, since the light sensitive elements are still able to detect an image based on individually collected photocurrents. In a specific example of implementation, each of the photo-diodes in an image sensor can include a photon-hole-side terminal connected to a readout circuit for measuring the hole current of a group of photodiodes. In a related example, the photon-electron side of each photodiode can be connected to a readout circuit to provide a signal for each individual photodiode.

In an specific example of implementation and operation, a method for execution by one or more processing modules of an imaging system includes sampling an image from a plurality of optical sensors, where the plurality of optical sensors are arranged in an array and sampling, over a predetermined period of time, the photo-current (photon-electrons or photon holes) of at least some of the plurality of optical sensors to produce a determined photo-current for the at least some of the plurality of optical sensors, where the sampling includes sampling photo-hole current for each of the at least some of a plurality of optical sensors. The method continues by determining a periodic intensity variation from a light source associated with the image based on the determined photo-current of at least some of a plurality of optical sensors, where the periodic intensity variation is determined by time-frequency analyzing the photo-current of the at least some of a plurality of optical sensors over the predetermined period of time.

FIG. 6 illustrates an example image sensor array with pixels (light sensitive elements) of two types configured in rows and columns. In the example, interleaved image sensor array 200 is configured in optical sensor rows 102 and optical sensor columns 104, such that incident light 106 from a scene sampled can be sampled by the interleaved image sensor array 200. In an example interleaved image sensor array 200 includes at least two types of sensors, a first sensor type configured to function for image collection and a second sensor type, flicker sensors 216, configured to function as flicker sensors.

In an example, flicker sensors 216 are interleaved in the interleaved image sensor array 200 in between regular sensors. In an example, the flicker sensors 216 can be configured with a specific readout operation for the interleaved image sensor array 200. In an alternative example, the flicker sensors 216 can be configured for readout during normal sampling of the interleaved image sensor array 200 with the imaging sensors. In an example, the flicker sensors 216 are configured to provide optimized performance, such as, for example, to accommodate increased dynamic range.

In an example, flicker sensors 216 can be used for flicker readout, and a row-by-row based Fast-Fourier transform (FFT) can be used to extract flicker components. In an example, flicker sensors 216 are provisioned without optical filters (i.e., they are "clear" sensors). In another example, the flicker sensors 216 use one or more optical filters specific for the target wavelength ranges of expected flicker sources.

In an example, an image sensor includes an array of standard or normal sensors and a plurality of flicker sensors optimized for detection of flicker components in an image. In an example, the flicker sensors are interleaved among the standard sensors. In a specific example, the flicker sensors are adapted to be read at a higher frequency readout rate ($F_{read\_flicker}$) than the normal sensors readout rate ($F_{pixel}$). The flicker sensors can be adapted to have higher sensitivity in order to accommodate the higher frequency readout rate ($F_{read\_flicker}$). In a representative example, the ($F_{pixel}$) can be 100 Hz, while the ($F_{read\_flicker}$) is 500 Hz.

In an example of implementation and operation, an imaging system includes a plurality of first optical sensors on an integrated circuit, where the plurality of first optical sensors are arranged in an array and a plurality of second optical sensors on the integrated circuit and where the plurality of second optical sensors are interspersed among the plurality of first optical sensors. In an example, a processing module is operably coupled to each optical sensor of the pluralities of first and second optical sensors and the processing module, when operable within the imaging system, is configured to sample a scene using the plurality of first optical sensors at a first frequency to produce a first image and sample the scene using the plurality of second optical sensors at a second frequency to produce a plurality of time-based samples of the plurality of second optical sensors, where the second frequency is higher than the first frequency. In an example of operation, the plurality of time-based samples of the plurality of second optical sensors can be used to attenuate or eliminate light source distortions from the first image.

In another example of implementation and operation, an imaging system includes a plurality of first optical sensors on an integrated circuit, where the plurality of first optical sensors are arranged in an array and a plurality of second optical sensors on the integrated circuit, where the plurality of second optical sensors are interspersed among the plurality of first optical sensors and the plurality of second optical sensors are arranged in a plurality of rows and columns. In an example, a processing module is operably coupled to each optical sensor of the pluralities of first and second optical sensors and the processing module, when operable within the imaging system, is configured to sample a scene using the plurality of first optical sensors at a first frequency to produce a first image and sample the scene using the plurality of second optical sensors sequentially on a row-by-row basis at a predetermined sampling rate to produce row-by-row sample outputs, where the processing module is further configured to initiate sampling at least some rows of the plurality of rows using different time stamps.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An imaging system, comprising:
   a plurality of optical sensors on an integrated circuit, wherein the plurality of optical sensors are arranged in an array, wherein the array comprises a plurality of rows and a plurality of columns;
   a plurality of sets of optical filters configured in a layer having a respective top surface and a respective bottom surface, wherein the bottom surface of the plurality of sets of optical filters is located proximal to the plurality of optical sensors, wherein each optical filter of a set of optical filters is configured to pass light in a different wavelength range;
   an interface configured to interface and communicate with the plurality of optical sensors;
   memory that stores operational instructions;
   processing circuitry operably coupled to the interface and to the memory, wherein the processing circuitry is configured to execute the operational instructions to:
      sample an image in a first mode; and
      sample at least a portion of the image sequentially on a row-by-row basis at a predetermined sampling rate in a second mode to produce row-by-row sample outputs, wherein the processing circuitry is further configured to initiate sampling at least some rows of the plurality of rows of optical sensors using different time stamps.

2. The imaging system of claim 1, wherein the processing circuitry is further configured to execute the operational instructions to determine, based on the row-by-row sample outputs, intensity variation associated with the image recurring at a substantially regular intervals.

3. The imaging system of claim 2, wherein the processing circuitry is further configured to execute the operational instructions to determine the intensity variation using a frequency-temporal algorithm.

4. The imaging system of claim 3, wherein the frequency-temporal algorithm is selected from a group consisting of:
a Fast Fourier Transform (FFT);
a Discrete Fourier Transform (DFT); and
a 2D Fast Fourier Transform (2D-FFT).

5. The imaging system of claim 1, wherein a set of optical filters includes a plurality of optical filters arranged in spatial pattern, wherein the spatial pattern includes an area without an optical filter.

6. The imaging system of claim 1, wherein the row by row sample outputs indicate an intensity variation recurring at a substantially regular interval.

7. An imaging system, comprising:
a first plurality of optical sensors, wherein the first plurality of optical sensors are arranged in an array;
a second plurality of optical sensors, wherein the second plurality of optical sensors are interspersed among the first plurality of optical sensors;
a processing module, wherein the processing module is configured to receive an output from each optical sensor of the first and second plurality of optical sensors, wherein the processing module is further configured to:
sample a scene at a first frequency using the first plurality of optical sensors to produce a first image;
sample the scene over a period of time T at a second frequency using the second plurality of optical sensors to produce an intensity over T, wherein the second frequency is higher than the first frequency; and
determine, based on the intensity over T, light distortion associated with the scene.

8. The imaging system of claim 7, wherein the first plurality of optical sensors and the second plurality of optical sensors are located on a same integrated circuit.

9. The imaging system of claim 7, wherein the first plurality of optical sensors and the second plurality of optical sensors have a respective sensitivity to light, wherein the sensitivity to light of the second plurality of optical sensors is higher than the sensitivity to light of the first plurality of optical sensors.

10. The imaging system of claim 7, wherein the first frequency is between 80 and 120 Hz and the second frequency is between 250 and 650 Hz.

11. The imaging system of claim 7, further comprising:
a plurality of sets of optical filters configured in a layer having a respective top surface and a respective bottom surface, wherein the bottom surface of the plurality of sets of optical filters is located proximal to the plurality of optical sensors, wherein each optical filter of a set of optical filters is configured to pass light in a different wavelength range, wherein one or more filters of the set of optical filters is adapted to pass light in a wavelength range specific to one or more optical sensors of the second plurality of optical sensors.

12. The imaging system of claim 11, wherein the processing module is further configured to sample the scene sequentially on a row-by-row basis to produce row-by-row sample outputs.

13. The imaging system of claim 11, wherein the processing module is further configured to sample the scene at a predetermined sampling rate.

14. The imaging system of claim 11, wherein the array comprises a plurality of rows and a plurality of columns of optical sensors, and wherein the processing module is further configured to initiate sampling at least some rows of the plurality of rows using a plurality of different time stamps.

15. The imaging system of claim 7, wherein each optical sensor of the second plurality of optical sensors is interleaved between a plurality of optical sensors of the first plurality of optical sensors.

16. The imaging system of claim 15, wherein the processing module is further configured to sample the first plurality of optical sensors sequentially using a first sequence and sample the second plurality of optical sensors sequentially using a second sequence.

17. The imaging system of claim 11, wherein one or more optical sensors of the second plurality of optical sensors is configured to have a larger dynamic range than any optical sensor of the first plurality of optical sensors.

18. A method for imaging a scene comprises:
sampling the scene in a first mode using a digital imager, wherein the digital imager includes a plurality of optical sensors arranged in an array, wherein the array comprises a plurality of rows and a plurality of columns of optical sensors;
sampling at least a portion of the scene sequentially on a row-by-row basis at a predetermined sampling rate in a second mode to produce row-by-row sample outputs, wherein the sampling for at least some rows of the plurality of rows of optical sensors uses different time stamps; and
determining an intensity variation for the row-by-row sample outputs using a frequency-temporal algorithm.

19. The method of claim 18,
wherein the determining an intensity variation includes determining whether the intensity variation occurs at regular intervals.

20. The method of claim 19, wherein the digital imager is adapted to include another plurality of other optical sensors, wherein the sampling at least a portion of the scene sequentially on a row-by-row basis is executed using the other optical sensors.

21. The method of claim 18, wherein the second mode includes sampling photo-hole currents for at least some optical sensors of the plurality of optical sensors.

22. The method of claim 21, further comprising determining, based on the photo-hole currents, the intensity variation.

23. The method of claim 21, wherein the intensity variation is further based on a frequency-temporal algorithm.

24. The method of claim 18, further comprising:
sampling the at least a portion of the scene sequentially on a row-by-row basis at another predetermined sampling rate.

25. The method of claim 18, wherein the digital imager includes a plurality of sets of optical filters overlaying the plurality of optical sensors.

26. The method of claim 18, wherein each optical filter of a set of optical filters is configured to pass light in a different wavelength range.

* * * * *